US012768735B2

(12) United States Patent
Zhang

(10) Patent No.: US 12,768,735 B2
(45) Date of Patent: Oct. 20, 2026

(54) MULTIPLE PARAMETER SENSING DEVICES FOR HARSH ENVIRONMENTS

(71) Applicant: UNIVERSITY OF NORTH TEXAS, Denton, TX (US)

(72) Inventor: Haifeng Zhang, Denton, TX (US)

(73) Assignee: University of North Texas, Denton, TX (US)

( * ) Notice: Subject to any disclaimer, the term of this patent is extended or adjusted under 35 U.S.C. 154(b) by 418 days.

(21) Appl. No.: 18/490,840

(22) Filed: Oct. 20, 2023

(65) Prior Publication Data

US 2024/0142328 A1 May 2, 2024

Related U.S. Application Data

(60) Provisional application No. 63/419,485, filed on Oct. 26, 2022.

(51) Int. Cl.

| | |
|---|---|
| ***G01L 19/04*** | (2006.01) |
| ***G01L 19/08*** | (2006.01) |
| ***G21C 17/003*** | (2006.01) |
| ***G21C 17/112*** | (2006.01) |
| ***H01M 10/48*** | (2006.01) |

(52) U.S. Cl.
CPC ............ *G01L 19/04* (2013.01); *G01L 19/086* (2013.01); *G21C 17/003* (2013.01); *G21C 17/112* (2013.01); *H01M 10/484* (2013.01); *H01M 10/486* (2013.01)

(58) Field of Classification Search
None
See application file for complete search history.

(56) References Cited

U.S. PATENT DOCUMENTS

| | | | | |
|---|---|---|---|---|
| 8,928,327 | B2 * | 1/2015 | Tennessen | G01R 31/382 324/427 |
| 2010/0288635 | A1 * | 11/2010 | Komiya | G01B 7/16 204/417 |
| 2025/0015309 | A1 * | 1/2025 | Mills | H01M 10/399 |

* cited by examiner

*Primary Examiner* — Peter J Macchiarolo
*Assistant Examiner* — Jermaine L Jenkins
(74) *Attorney, Agent, or Firm* — Thomas Horstemeyer LLP.

(57) ABSTRACT

Aspects of monitoring using harsh environment sensing devices and systems are described. Multiple parameters are detected using the sensing devices immersed in a harsh environment such as a caustic solution. The parameters detected using the harsh environment sensing devices and systems include pressure, depth, density, temperature, or any combination thereof.

17 Claims, 6 Drawing Sheets

MULTIPLE PARAMETER SENSING DEVICES FOR HARSH ENVIRONMENTS

CROSS-REFERENCE TO RELATED APPLICATIONS

This application claims priority to and the benefit of U.S. Provisional Application No. 63/419,485, which is hereby incorporated herein by reference in its entirety.

BACKGROUND

High temperature environments, caustic environments, radioactive environments, and other harsh environments can present challenges to current sensing and instrumentation technologies. Harsh environments can require monitoring in order to ensure safe operation of equipment and industrial processes, and the environments themselves can be harmful for sensors. Nuclear reactor pressure vessels (RPVs), spent fuel storage canisters, the interior of carbon storage pipes, petroleum pipes, and other hazardous locations in the energy industry can also be impractical or impossible to monitor using traditional sensors.

Batteries can also present sensing challenges. Efficiency improvement of lithium ion battery for electric vehicle and other applications during charging and discharging requires an understanding of the battery health state and the ability to estimate the remaining lifetime of the battery in its operational environment. One reason that a lithium ion battery degraded is due to the dissolution of the material of cathode and anode into the electrolyte as well as the loss the electrolyte. While existing sensing technologies rely on current and voltage during charging and discharging to estimate the cathode and anode mass using machine learning. However, this approach requires a large amount of data and relatively long timelines. The process to obtain the data of the mass for cathode and anode can also require a destructive test of the battery. As a result, there is a need for improvements in monitoring and sensing technologies in these applications, among others.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

DETAILED DESCRIPTION

The present disclosure relates to wireless hybrid monitoring using differential pressure sensors. As noted above, traditional techniques for measuring parameters of electrode-leveraging devices including battery devices and nuclear fuel devices can be impractical, inefficient, and slow. These technologies present a number of challenges.

In battery technologies, efficiency improvement of lithium ion batteries for electric vehicles and other applications during charging and discharging requires an understanding of the battery health state and the ability to estimate the remaining lifetime of the battery in its operational environment. One reason that a lithium ion battery can become degraded is due to the dissolution of the material of the cathode and the anode into the electrolyte, as well as the loss of the electrolyte. A current approach to detect the change of the mass of cathode and anode is to measure the current and voltage during charging and discharging. From the voltage and current monitoring, one can estimate the cathode and anode mass by using method such as machine learning. However, this approach requires a large amount of data and extremely long time. The process to obtain the data of the mass for cathode and anode can require destructive test of the battery.

In the area of nuclear spent fuel, there are additional considerations. The electrorefining process used for pyrochemical recycling of spent nuclear fuel can include extraction of uranium and transuranic from waste fission products in used fuel. As part of this process, special nuclear materials (SNM) can dissolve into the molten salt electrolyte. Monitoring the mass of these materials, particularly plutonium, is important for material accountability and safeguards of the electrorefiner (ER) used in pyroprocessing. Inductively coupled plasma mass spectrometry (ICP-MS) and/or other analytical techniques can be used to obtain the actinide concentration in the molten salt. Harsh environmental conditions including temperatures over 500° C., strong radiation, and a highly corrosive oxidizing environment inside the molten salt presents a great challenge for sensing technology.

Some solutions can use a bubbler method to measure the level and density of the molten salt. However, these methods needs to flow an inert gas such as Argon through a tube inside the molten salt and use a number of outside pressure transducers and flow meters to determine the density and level indirectly. In addition, existing bubblers in molten salts can suffer from a clogging issue during operation, which can make the sensor functionless. However, the present disclosure describes mechanisms and systems that can more quickly, efficiently, and effectively monitor a variety of parameters using differential pressure techniques. These techniques can be adapted to multiple different applications and can be used to monitor multiple different parameters of interest for each of these applications.

Figure 1:
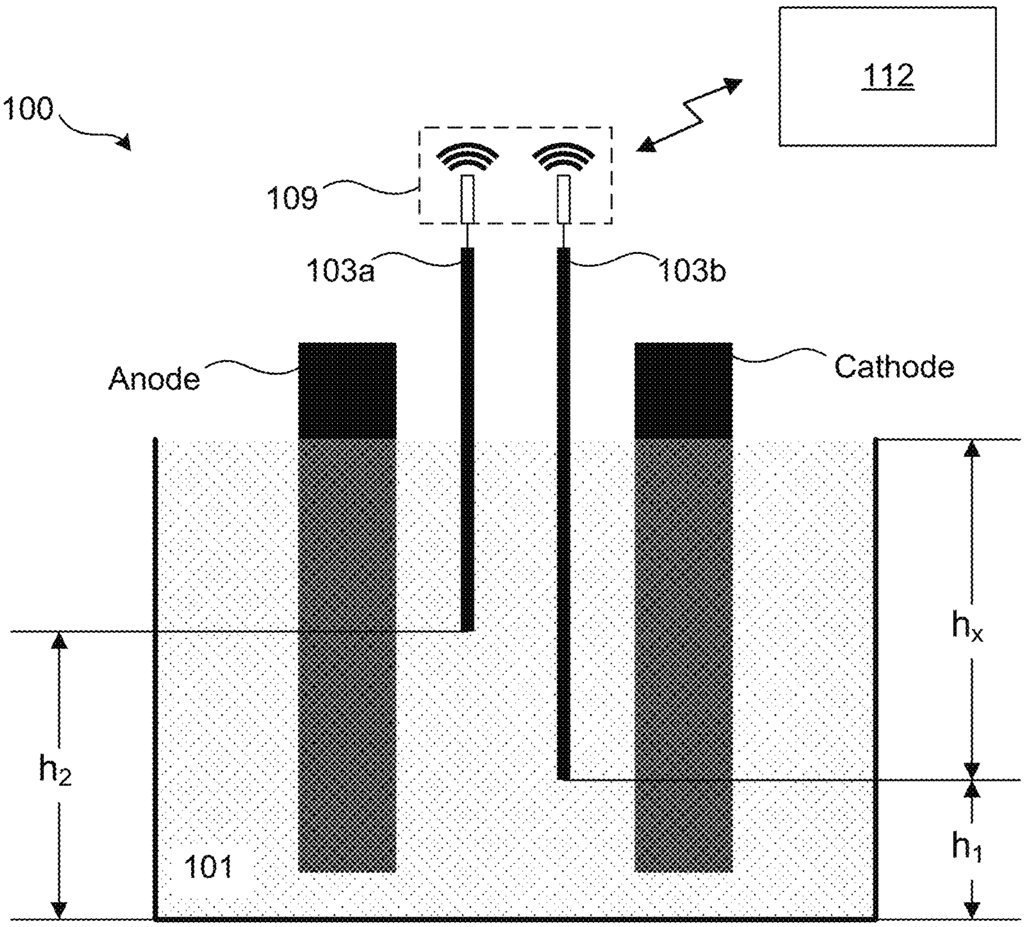
FIG. 1 illustrates an example multiple-parameter monitoring system, according to various embodiments described herein.

With reference to FIG. 1, shown is an example of a multiple-parameter monitoring system 100. The principles described with respect to the multiple-parameter monitoring system 100 can generally apply to any electrode based device such as a battery or nuclear fuel/spent fuel device as discussed herein. The electrode based devices can include an electrochemical or other device that includes electrodes in a liquid and/or pasty solution such as the solution 101. The electrode based devices can include medical devices, industrial devices, and other applications such as electroplating, electrolysis, welding, cathodic protection, and others. In the discussion of FIG. 1, however, the discussion can focus on the nonlimiting example of a battery device.

The multiple-parameter monitoring system 100 can include a number of pressure sensors or pressure sensing devices that include pressure sensors. The pressure sensors can include pressure sensors 103, which can include an upper pressure sensor 103*a*, a lower pressure sensor 103*b*, and additional intermediate pressure sensors in some implementations. The multiple-parameter monitoring system 100 can also include wireless transmission components 109. The multiple-parameter monitoring system 100 can also include a parameter monitoring service 112 in network communication with the pressure sensors 103 through the wireless transmission components 109. The multiple-parameter monitoring system 100 can be considered a sensing device or system for the parameters that it monitors.

The solution 101 can include a battery electrolyte solution that is used in a battery. Depending on the type of battery, the solution can be a liquid or paste-like substance. The solution 101 can transport charged ions between the cathode and anode of the battery or other device. The solution 101 can include a molten salt type solution or another type of solution.

The upper pressure sensor 103*a* can include a pressure sensor that is mounted at a vertically higher position relative to the lower pressure sensor 103*b*. The lower pressure sensor 103*b* can include a pressure sensor that is mounted at a vertically lower position relative to the upper pressure sensor 103*a*.

The pressure sensors 103 can be made of materials that do not degrade quickly in the solution 101. The pressure sensors 103 can be made of a high temperature piezoelectric crystal, and can be referred to as a piezoelectric pressure sensor. However, in some examples, the pressure sensors 103 can include interferometric fiber optic pressure sensors, quartz resonant pressure sensors, or sodium potassium filled pressure sensors for battery applications. The pressure sensors 103 can also be provided using the multiple-parameter sensing devices as described in FIGS. 3 and 4. The multiple-parameter sensing devices can be capable of measuring temperature and pressure, and providing compensation for temperature shifts, in addition to the pressure and depth sensing abilities of the multiple-parameter monitoring system 100. Accordingly, the multiple-parameter monitoring system 100 can be tuned and designed to accurately identify pressure, depth, density, temperature, or any combination thereof.

Unlike piezoresistive and capacitive transducers, piezoelectric pressure sensors can omit external power sources such as voltage or current sources. Piezoelectric pressure sensors such as the pressure sensors 103 can generate an electronic output signal directly from the applied strain within the solution 101. The output from the piezoelectric element is a charge proportional to pressure. Detecting this can utilize a charge amplifier to convert the signal to a voltage.

Some piezoelectric pressure sensors can include an internal charge amplifier to simplify the electrical interface by providing a voltage output. However, this option supplies power to the sensor. An internal or external amplifier can be used with the pressure sensors 103 in some applications. The amplifier can enable longer signal cables can be used to connect to the sensor. The amplifier or overall system can also include signal-conditioning circuitry to filter the output, adjust for temperature, and compensate for changing sensitivity of the pressure sensors 103 based on predetermined operational parameters.

The wireless transmission components 109 can include components capable of wireless communications over one or more local area networks or wide area networks. Local area networks can include peer-to-peer and other direct communications between two devices. Wireless transmission components 109 can include devices capable of generating or communicating over cellular networks, satellite networks, Institute of Electrical and Electronic Engineers (IEEE) 802.11 wireless networks (i.e., WI-FI®), BLUETOOTH® networks, Zigbee® networks, microwave transmission networks, as well as other networks relying on radio broadcasts. For example, the wireless transmission components 109 can include wireless chips such as Xbee® 3 or Xbee-Pro® (footprint ~1"×1", 4000 Ft or 1.2 km, 40 mA @ 3.3V, 250 Kbps), which can communicate with a computing device of the parameter monitoring service 112. This can include a display that shows a readout in a control room of a facility, such as a nuclear facility, an industrial facility, a medical facility, and so on depending on the application of the multiple-parameter monitoring system 100.

The parameter monitoring service 112 can be a device that is located locally or remotely from the battery or electrode device such as an electrolytic cell. Alternatively, the battery or other device itself can include the parameter monitoring service 112. In any case, the parameter monitoring service 112 can take inputs from the pressure sensors 103 and process these inputs according to the principles described. The parameter monitoring service 112 can generate and output parameters such as, for example, a density and level of the electrolyte or solution 101. The parameter monitoring service 112 can include a display, and can show the parameter outputs as well as a history of the density and level on the display. The historical datapoints can be graphed to show a change of the parameters over time, calculate an average, median, or moving average over a specified time chunk and so on. The parameter monitoring service 112 can also provide these parameter outputs to control systems that provide notifications to administrators, engineers, and other users to alert them to operating conditions. The user interface and/or the notification can indicate an action to take in response to the parameters, such as an indication to service the battery, nuclear, medical, or other electrode device. In some examples, the control systems that receive parameters from the parameter monitoring service 112 can make automatic adjustments such as stopping or modifying one or more process that uses the battery, nuclear, medical, or other electrode device.

The parameter monitoring service 112 can include instructions that map the pressures received from the pressure sensors 103 to the output parameters. The pressures and/or the output parameters can also be mapped to specified actions such as transmitting a notification or transmitting a subset of the parameters as a notification or instructions to provide rectifying or corrective action.

The parameter monitoring service 112 can be executed using one or more computing devices that are in wired and/or wireless communications with the pressure sensors 103. For example, the parameter monitoring service 112 can include a cloud-based service that is accessible over a public wide area network such as the Internet. The parameter monitoring service 112 can include a service that is hosted privately and is accessible over a private wide area network, or a local area network. In some examples, the parameter monitoring service 112 can be located on the battery device, in a vehicle or other system that includes the battery device or other electrode device.

For materials accountancy purposes, in addition to the concentration data, the volume and density of the molten salt can be used to calculate the total mass of uranium, plutonium, and other actinides in the salt. The density and level (Volume can be calculated when the area is known or predetermined) of the molten salt can be determined by measuring the differential pressure inside the molten salt. The multiple-parameter monitoring system 100 can be considered a differential pressure monitoring system 100, but can also be used to identify pressure, depth, density, temperature, or any combination thereof.

The multiple-parameter monitoring system 100 can be deployed to measure the electrolyte to monitor a pressure difference. The parameter monitoring service 112 can use this pressure difference to determine the density and level (or depth) of the electrolyte. Since the density/level is an indication of amount of cathode/anode mass that have been dissolve into the electrolyte and amount of remaining electrolyte, this sensor will provide accurate estimation of the battery health and remaining life.

Two pressure sensors 103*a* and 103*b* can be installed inside a battery or other device to measure density and level simultaneously. Their locations relative to the bottom of the battery can be known. These locations can correspond to vertical distances ($h_1$ and $h_2$), from a particular reference such as a bottom of the battery or another predetermined reference location. Since the pressures that the sensors 103*a* and 103*b* measured respectively can be calculated according to equations 1 and 2 below.

$$p_1=\rho g h_x \quad (1)$$

$$p_2=\rho g(h_x+h_1-h_2) \quad (2)$$

The pressure $p_1$ is related or equated to the known force of gravity g, the variable depth $h_x$ of the sensor 103*b* in the solution 101, and desired parameter density ρ of the solution 101. The pressure $p_2$ is related or equated to the force of gravity g, a variable depth ($h_x+h_2$) of the sensor 103*a* in the solution 101, and desired parameters including the density ρ of the solution 101. The level $h_x+h_1$ of the molten salt or other solution 101 can be identified using these two relationships and the known heights of the pressure sensors 103. Accordingly, the parameter monitoring service 112 can include a data and/or process that relates the pressures $p_1$ and $p_2$ to the desired parameters. This can be used to map the pressure value readings to timestamped or time-associated values for these and other desired parameters.

In other words, by measuring pressures $p_1$ and $p_2$, we are able to determine the density ρ and height $h_x$ (thus the level $h_x+h_1$ of the molten salt or other solution 101 with respect to the bottom of the battery). The value $p_1$ can correspond to the pressure sensor 103*a*, while the value $p_2$ can correspond to the pressure sensor 103*b*.

Figure 2:
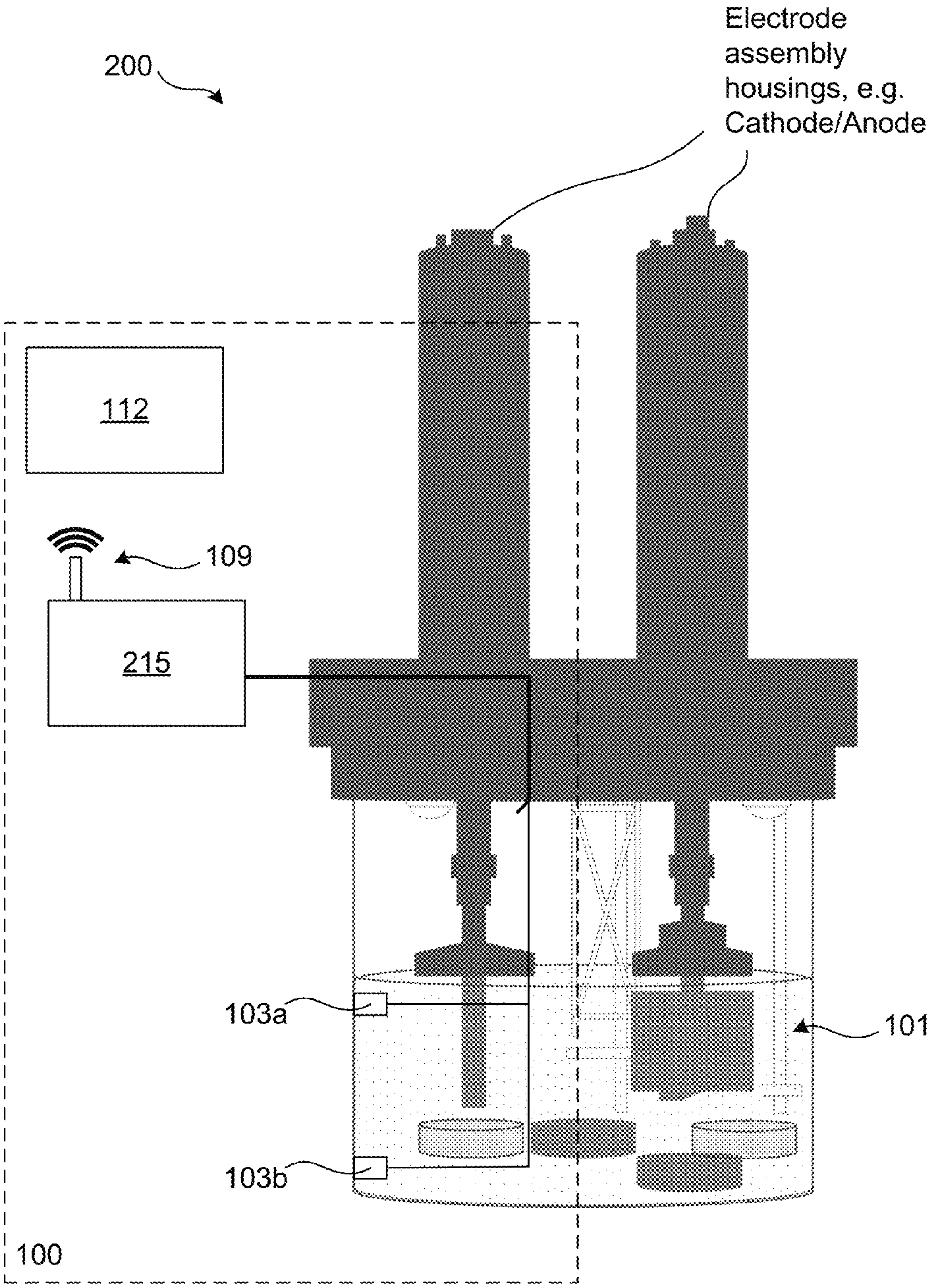
FIG. 2 illustrates another multiple-parameter monitoring system, according to various embodiments described herein.

With reference to FIG. 2, shown is an example of a multiple-parameter monitoring system 100 in a nuclear facility 200. The principles described with respect to the multiple-parameter monitoring system 100 as described in FIG. 1 can generally apply to the nuclear facility 200 of FIG. 2 as well. The principles described with respect to the nuclear facility 200 application shown in FIG. 2 can also be applied to the other figures as can be understood in reference to the present disclosure.

The multiple-parameter monitoring system 100 can again include a number of pressure sensors 103. Pressure sensors 103 can include an upper pressure sensor 103*a*, a lower pressure sensor 103*b*, and additional intermediate pressure sensors in some implementations. The multiple-parameter monitoring system 100 can also include wireless transmission components 109. The multiple-parameter monitoring system 100 can also include a parameter monitoring service 112 in network communication with the pressure sensors 103 through the wireless transmission components 109.

The solution 101 can include an electrolyte solution that is used in a device such as an electrolytic cell or electrorefiner of the nuclear facility 200. Depending on the type of device, the solution can be a liquid or paste-like substance. The solution 101 can transport charged ions between the cathode and anode of the battery or other device. The solution 101 can include a molten salt type solution or another type of solution.

The upper pressure sensor 103*a* can include a pressure sensor that is mounted at a vertically higher position relative to the lower pressure sensor 103*b*. The lower pressure sensor 103*b* can include a pressure sensor that is mounted at a vertically lower position relative to the upper pressure sensor 103*a*.

The pressure sensors 103 can be made of materials that do not degrade quickly in the solution 101. In nuclear applications as in FIG. 2, this means the materials must be resilient and resistant to nuclear environments. The device can included a contained nuclear enclosure that contains the harsh environmental conditions including temperatures at and over 500° C., strong radiation, and a highly corrosive oxidizing environment inside one or more molten salt or other solution 101 presents a great challenge for sensing technology.

The pressure sensors 103 can be made of a high temperature piezoelectric crystal, and can be referred to as a piezoelectric pressure sensor. The pressure sensors 103 can utilize special pressure sensors and special communicative components within the nuclear enclosure, in order to survive and operate properly within this harsh environment. The nuclear enclosure can include an electrorefiner or another nuclear electrolytic device that contains nuclear fuel or spent fuel. Specifically the pressure sensors 103*a* and 103*b* of FIG. 2 can be radiation-tolerant and can be installed within the electrorefiner at different height. The pressure sensors 103*a* and 103*b* can be made of a high temperature piezoelectric crystal—Aluminum Nitride (AlN), which is capable of maintaining its piezoelectricity up to 1400° C.

Since pressure is a function of both density and the level, by measuring the pressure from two sensors, the density and level can be determined simultaneously as outlined above. This can be considered hybrid density, level, and other parameters sensing because it quickly and concurrently identifies these parameters. Notably, this calculation is much quicker than the techniques of existing technologies that use machine learning. The reading from the pressure sensors 103 can be transmitted wirelessly to a monitoring service 112 that includes a computing device in a control room for processing. The pressure measurement of the pressure sensors 103 can be achieved by monitoring a resonant frequency of a micro AlN tuning fork. The tuning fork can in some examples include a double ended tuning fork structure. Since the resonant frequency is a physical parameter that can be measured accurately and with precision, and its value is very sensitive to applied pressure, this type of sensor can provide an excellent measurement of the level and density of the molten salt or other solution 101. Compared with Nak-filled pressure sensors, the proposed AlN pressure sensor can be fully submerged into the solution 101 of molten salt and other materials for direct measurement of pressure change. This can provide measurements that have high accuracy and high repeatability or precision.

The wireless transmission components 109 can include components capable of wireless communications over one or more local area networks or wide area networks. The parameter monitoring service 112 can be a device that is located locally or remotely from the nuclear containment device. The parameter monitoring service 112 can take inputs from the pressure sensors 103 and process these inputs according to the principles described. In this example, a circuit 215 can mediate providing pressure readings from the pressure sensors 103 to the wireless transmission components. The circuit 215 can include a voltage regulator and a signal conditioner, among other components. The parameter monitoring service 112 can generate and output parameters such as, for example, a density and level of the electrolyte or solution 101. The parameter monitoring service 112 can include a display, and can show the parameter outputs as well as a history of the density and level on the display.

The historical datapoints can be graphed to show a change of the parameters over time, calculate an average, median, or moving average over a specified time chunk and so on. The parameter monitoring service 112 can also provide these parameter outputs to control systems that provide notifications to administrators, engineers, and other users to alert them to operating conditions. The user interface and/or the notification can indicate an action to take in response to the parameters, such as an indication to service the nuclear facility 200 or aspects of the container such as the anode, cathode, electrolyte solution 101, and other items. In some examples, the control systems that receive parameters from the parameter monitoring service 112 can make automatic adjustments such as stopping or modifying one or more process.

Figure 3:
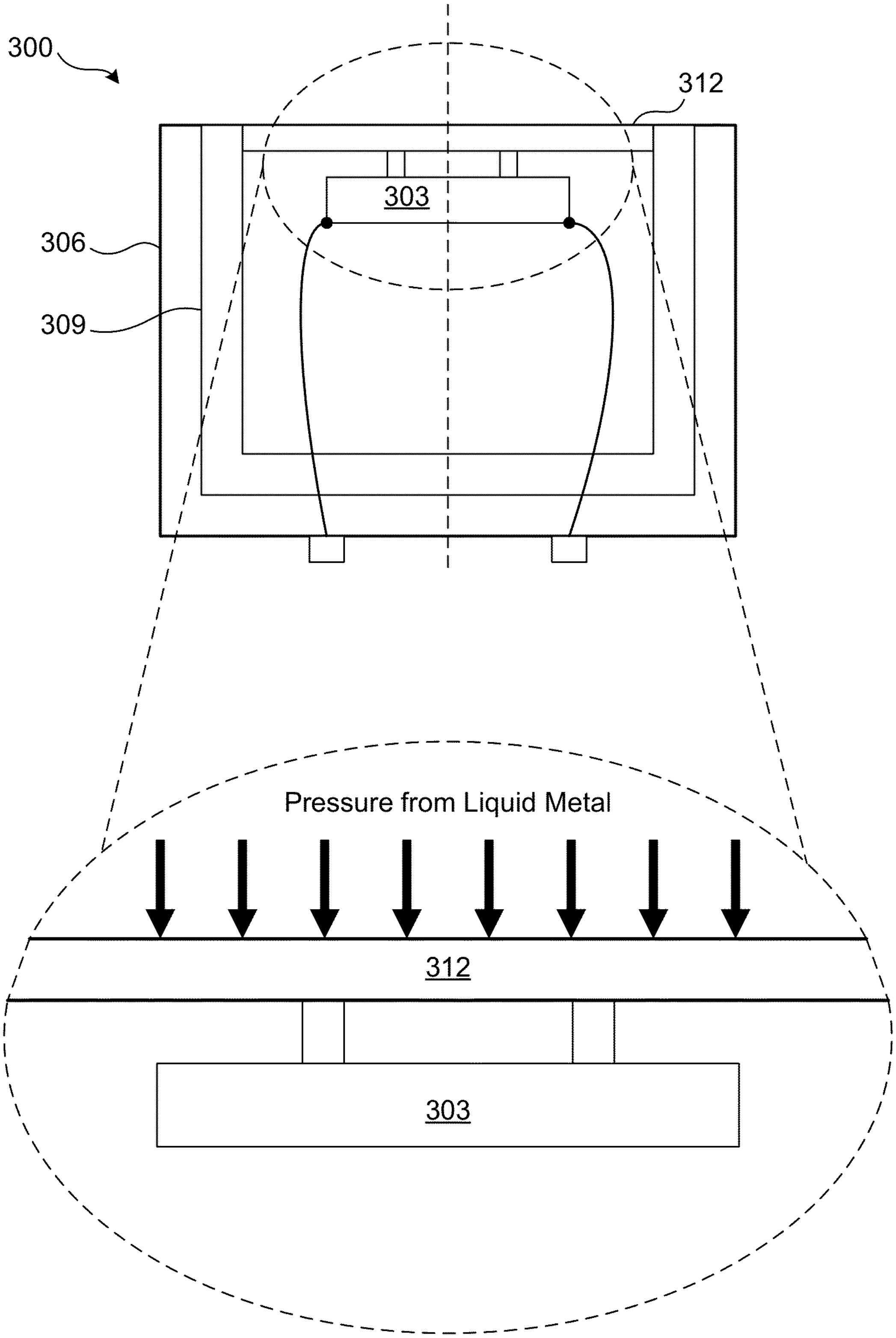
FIG. 3 illustrates a multiple-parameter sensing device, according to various embodiments described herein.

FIG. 3 illustrates a multiple-parameter sensing device 300. The multiple-parameter sensing device 300 that measures pressure and temperature. The multiple-parameter sensing device 300 can include one or more resonant sensor(s) 303. The resonant sensor(s) 303 can include AlN MEMS tuning fork crystals. The resonant sensor(s) 303 can be considered pressure sensors and temperature sensors. The multiple-parameter sensing device 300 can include a stainless steel housing 306 with tungsten carbide (WC) shielding 309 inside an inner surface. This double layer structure can shield the sensors from radiation in the environment. The stainless steel housing 306 can be axisymmetric about one or more axes including the shown axis. The multiple-parameter sensing device 300 can include a stainless steel diaphragm 312 as well. In some examples, the stainless steel diaphragm 312 can cover the WC shielding 309 and extend to make contact with the stainless steel housing 306. In some cases, the stainless steel diaphragm 312 can be considered a face of the stainless steel housing 306. The stainless steel housing 306 (and the stainless steel diaphragm 312) can protect the device from physical intrusions from harsh environments.

The stainless steel housing 306 can be filled with argon or another inert gas to prevent possible air leakage to sodium in a sodium rich environment outside the housing. The resonant sensor 303 can include a high mechanical Quality factor because it can include two tines that move opposite of each other. This two-tine system can cause the moments and forces from one tine cancel those of the second tine. When an external molten salt applies pressure, the corrosion-resistant stainless steel diaphragm 312 causes deformation of the crystal of the resonant sensor 303 and generates frequency shifts.

A computing device included with or connected to the multiple-parameter sensing device 300 can measure the shifts of the main mode to calculate the pressure in the sodium. One challenging issue in some technologies is that resonance frequency can change in the tuning fork mechanics as a result of temperature shift. To address this issue, the multiple-parameter sensing device 300 can utilize a closed loop feedback and temperature compensation circuit that is designed to offset the temperature induced frequency shift.

A dual sensor setup can enable the multiple-parameter sensing device 300 to measure two parameters, temperature and pressure. The dual sensor setup can also perform temperature compensation and corrections. In some examples, this is performed using a computing device local to the multiple-parameter sensing device 300, and in other examples, the frequency data can be transmitted to a parameter monitoring service 112 in network communication with the multiple-parameter sensing device 300, and a computing device of the parameter monitoring service 112 can identify temperature and pressure as well as temperature compensation. The multiple-parameter sensing device 300 can be considered a piezoelectric sensing device in instances where the resonant sensors 303 use a piezoelectric effect using materials on the tines, such as AlN.

The multiple-parameter sensing device 300 can include multiple resonant sensors 303 with at least one making contact with the stainless steel diaphragm 312 (shown at the top of the figure), and at least one making contact with the stainless steel housing 306. The resonant sensors 303 for pressure readings can be connected to the stainless steel diaphragm 312. One or more resonant sensors 303 connected to the stainless steel housing 306, utilized for temperature readings and can be utilized for temperature compensation and corrections. In various examples, the resonant sensors 303 connected to the stainless steel housing 306 can be connected to the stainless steel housing 306 through components that pass through one or more gaps in the WC shielding 309. In some examples, the resonant sensors 303 referred to as connected to the stainless steel housing 306 can be connected to the WC shielding 309 of the housing.

The multiple-parameter sensing device 300 can utilize the predetermined positions of the resonant sensors 303 (for example, connected to a particular position on the stainless steel diaphragm 312 or a particular position on the stainless steel housing 306) to determine temperature and pressure using the changes in resonant frequency and other mechanical properties measured from the resonant sensors 303. The position data can be aided by the dimensions of the stainless steel diaphragm 312 and the overall tuning fork tines of the resonant sensors 303. In some examples, the multiple-parameter sensing device 300 known measurements can be for temperature and pressure can be used to identify a relationship between temperature, pressure, and the resonant frequencies of the resonant sensors 303 connected to the stainless steel diaphragm 312 and the stainless steel housing 306, for a particular type of molten salt or other solution 101. The relationship or mapping can be used to map or identify temperature and pressure using the specific arrangement of resonant sensors 303 of the multiple-parameter sensing device 300. The multiple-parameter sensing device 300 (and/or individual resonant sensors 303 can communicate outside of the housing using two or more electrodes. In some examples, the electrical excitation pads of the sensors 303 can electrically connect to an outside of the multiple-parameter sensing device 300. The multiple-parameter sensing device 300 can identify resonant frequencies of multiple resonant sensors 303 and information about the location(s)

or positions of these sensors to generate measurements of pressure, depth, density, temperature, or any combination thereof.

As can be seen in the detail view, pressure from liquid metal salts or other solutions 101 can cause pressure to press against the stainless steel diaphragm 312. In some examples, such as for tuning fork sensors, one or more of the resonant sensors 303 can be held to the diaphragm using the steel structures protruding from the stainless steel diaphragm 312. Deformation of the stainless steel diaphragm 312 will cause the deformation and resonating of the resonant sensors 303 based on the connections with the steel structures protruding from the stainless steel diaphragm 312. While this example can use steel structures protruding from the diaphragm, stainless steel diaphragm 312, the device can additionally or alternatively use two (or any other number of) bonding pads, solder bumps, MEMS structures protruding from the resonant sensor 303, or other bosses to connect the stainless steel diaphragm 312 to the resonant sensor 303.

The multiple-parameter sensing device 300 can measure changes in resonant frequency and other mechanical properties of the resonant sensors 303, caused by temperature fluctuations and pressure fluctuations or changes. This can affect a surface acoustic wave or another resonant wave. While the pressure sensors 303 are referred to as tuning fork sensors, surface acoustic wave sensor configurations can also be used. In some examples, surface acoustic wave sensors can be used for one parameter or connection such as temperature (and/or pressure) of the housing while tuning fork sensors are used for another parameter or connection such as pressure (and/or temperature) of the diaphragm. However, any combination of tuning fork and SAW devices can be used in various examples. While the housing and the diaphragm are referred to as stainless steel, other durable materials can also be used.

Figure 4:
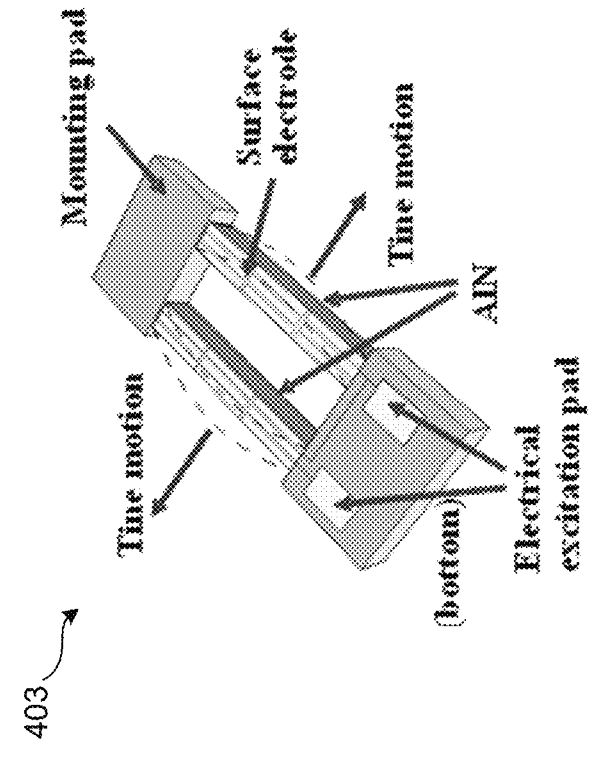
FIG. 4 illustrates a tuning fork sensor of the multiple-parameter sensing device, according to various embodiments described herein.

FIG. 4 illustrates an isometric view of a tuning fork sensor 403 of the multiple-parameter sensing device 300. The tuning fork sensor 403 can be a resonant sensor 303 for pressure, temperature, and other parameters. This figure shows how the tine motion of one tine can at least partially cancel those of the second. In some examples, both tines of one tuning fork sensor 403 can be excited by or caused to resonate based on the stainless steel diaphragm 312 to enable a pressure reading while both tines of another resonant sensor 303 can be excited by or caused to resonate based on a stainless steel housing 306 to enable a temperature reading along with pressure, and further enabling more accurate pressure readings by compensating for temperature induced frequency shift. In some examples, the electrical excitation pads can electrically connect to an outside of a multiple-parameter sensing device 300.

Figure 5:
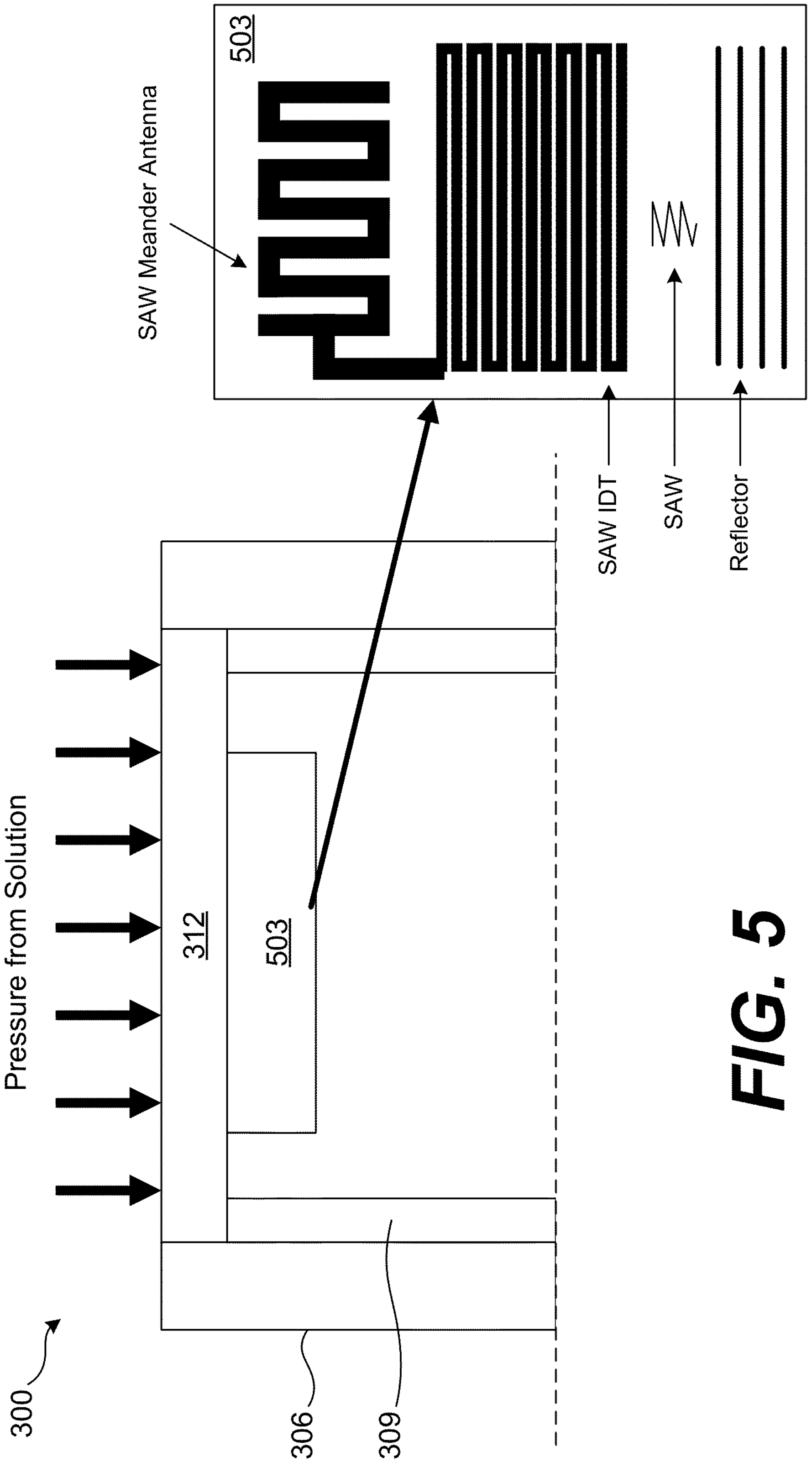
FIG. 5 illustrates a surface acoustic wave sensor of the multiple-parameter sensing device, according to various embodiments described herein.

FIG. 5 illustrates views of a SAW sensor 503 of a multiple-parameter sensing device 300. The SAW sensor 503 can be a resonant sensor 303 for pressure, temperature, and other parameters. The SAW sensor 503 can be used with a multiple-parameter sensing device 300. The SAW sensor 503 can be attached on the backside of the diaphragm 312. When the pressure is applied to the diaphragm 312, the deformation of the diaphragm 312 can cause the deformation of the SAW resonator of the SAW sensor 503, which will be reflected by its frequency shift. So, by measuring the frequency shift, the pressure can be identified.

In some examples, the saw sensor 503 can include a meander antenna, an interdigital transducer, and a reflector. The meander antenna can generate and transmit and receive signals containing information related to the sensed parameter, and can couple RF (Radio-Frequency) signals into and out of the SAW device. However, in some examples, the meander antenna can generate signals and provide them to the interdigital transducer based on the pressure from the solution, whether RF signals are generated or received wirelessly. The interdigital transducer generates and receives SAWs for sensor operation. The SAW carries information about the sensed parameter, and the reflector can reflect the wave enabling frequency shift operations and other functions. The interaction between these components allows for the detection and measurement of various parameters with high accuracy and precision. While not shown here, electrical excitation pads can additionally or alternatively electrically connect to an outside of the multiple-parameter sensing device 300 for excitation.

Figure 6:
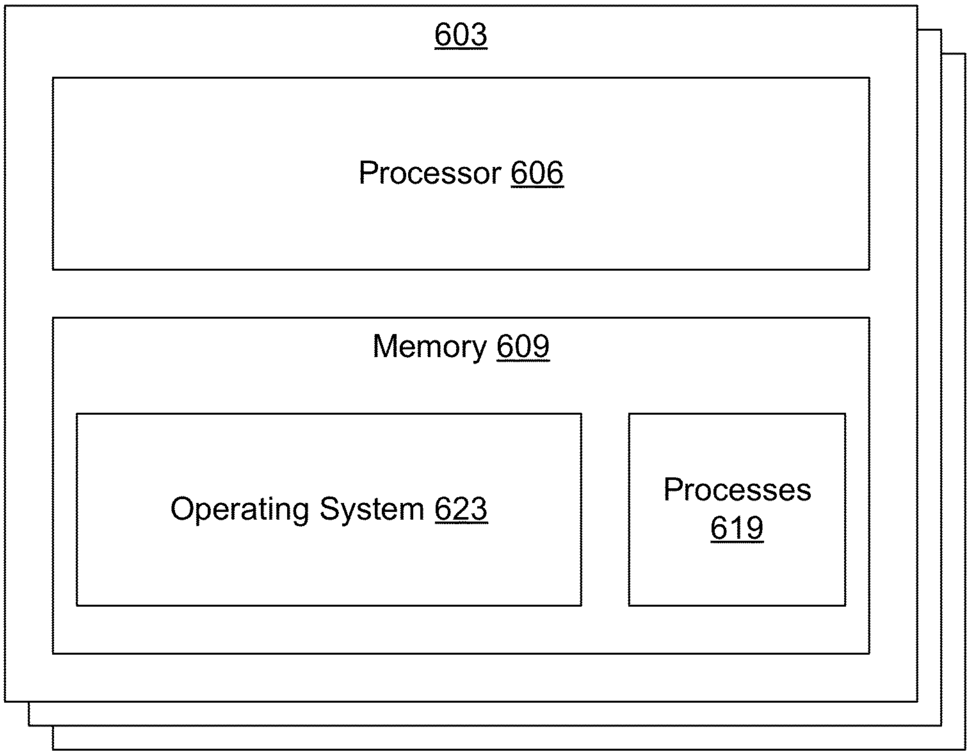
FIG. 6 is a drawing depicting a computing device for one or more of the components of the monitoring systems and other devices described, according to various embodiments described herein.

FIG. 6 depicts a schematic block diagram of one example of one or more computing devices 603 for the components of the networked environment of FIG. 1, according to various embodiments of the present disclosure. A computing device 603 can have one or more processors 606. The computing device 603 can also have a memory 609.

The processor 606 can represent any circuit or combination of circuits that can execute one or more machine-readable instructions stored in the memory 609 that make up a computer program or process and store the results of the execution of the machine-readable instructions in the memory 609. In some implementations, the processor 606 may be configured to perform one or more machine-readable instructions in parallel or out of order. This could be done if the processor 606 includes multiple processor cores and/or additional circuitry that supports simultaneous multithreading (SMT). Examples of a processor 606 can include a central processing unit (CPU), a graphics processing unit (GPU), a field-programmable gate array (FPGA), application specific integrated circuits (ASICs), etc.

The memory 609 can include both volatile and nonvolatile memory and data storage components. Volatile components are those that do not retain data values upon loss of power. Nonvolatile components are those that retain data upon a loss of power. Thus, the memory 609 can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device. Various types of data and machine-readable instructions may be stored in the memory 609. For example, one or more processes 619 may be stored in the memory 609. In some implementations, an operating system 623 may also be stored in the memory 609.

A process 619 can represent a collection of machine-readable instructions stored in the memory 609 that, when executed by the processor 606 of the computing device 603, cause the computing device 603 to perform one or more tasks. A process 619 can represent a program, a sub-routine or sub-component of a program, a library used by one or more programs, etc. When a process requests access to a hardware or software resource for which it lacks permission to interact with, the process 619 can generate an interrupt and provide or send the interrupt to the operating system 623. The process 619 can perform the actions described for the various devices and systems herein. The actions performed by the process 619 can also be considered steps or blocks of a method performed by the computing device or devices 603.

The operating system 623 can include any system software that manages the operation of computer hardware and software resources of the computing device 603. The operating system 623 can also provide various services or functions to computer programs, such as processes 619, that are executed by the computing device 603. Accordingly, the operating system 623 may schedule the operation of tasks or processes 619 by the processor 606, act as an intermediary between processes 619 and hardware of the computing device 603. The operating system 623 may also implement and/or enforce various security safeguards and mechanisms to prevent access to hardware or software resources by unprivileged or unauthorized users or processes 619.

The operating system 623 can also implement a virtual memory system that provides an abstract representation of the memory 609 available on the computing device 603, such as the RAM. Among the features provided by the virtual memory system are a per process 619 address space, which maps virtual addresses used by a process 619 to physical addresses of the memory 609. The processor's memory management unit (MMU) can translate these virtual addresses to physical addresses, when used. The operating system 623 can use the virtual memory system to present more memory 609 to individual processes 619 than is physically available.

A number of software components discussed can be stored in the memory of computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), persistent memory, hard drive, solid-state drive, Universal Serial Bus (USB) flash drive, memory card, optical disc such as compact disc (CD) or digital versatile disc (DVD), floppy disk, magnetic tape, or other memory components.

Memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, graphics processing units (GPUs), field-programmable gate arrays (FPGAs), or other components, etc. Such technologies are generally well known by those skilled in the art and, consequently, are not described in detail herein.

Flowcharts and actions described may be used to describe the functionality and operation of an implementation of portions of the various embodiments of the present disclosure. If embodied in software, each block or action described with respect to a figure can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although flowcharts and actions can show or be discussed with respect to a specific order of presentation, it is understood that the order of execution can differ from that which is depicted or discussed as an example. For example, the order of execution of two or more blocks or actions can be scrambled relative to the order shown. Also, two or more blocks or actions shown or discussed in succession can be executed concurrently or with partial concurrence. Further, in some embodiments, one or more of the blocks or actions can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a “computer-readable medium” can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase “at least one of X, Y, or Z,” unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. While concepts of the present disclosure are discussed with respect to a particular figure, the concepts can also be used in connection with and combined with the other figures. All such modifications and variations are intended to be included herein within the scope of this disclosure and protected by the following claims.

Therefore, the following is claimed:

1. A system for parameter monitoring, the system comprising:

a first pressure sensor located at a first predetermined height relative to a predetermined position within an electrolyte solution, wherein the first pressure sensor detects a first pressure reading;

a second pressure sensor located at a second predetermined height relative to the predetermined position within the electrolyte solution, wherein the second pressure sensor detects a second pressure reading;

a parameter monitoring service that receives the first pressure reading and the second pressure reading, and maps the first pressure reading and the second pressure reading to at least one parameter value for at least one predetermined parameter;

wherein at least one of the first pressure sensor and the second pressure sensor is provided using a multiple parameter sensing device that identifies temperature and pressure, the multiple parameter sensing device comprising a housing, a diaphragm, and a plurality of resonant sensors, wherein a first resonant sensor is connected to the diaphragm and a second resonant sensor is connected to the housing, thereby enabling compensation for temperature induced frequency shift.

2. The system of claim 1, wherein the at least one predetermined parameter comprises at least one of: a level of the electrolyte solution, and a density of the electrolyte solution.

3. The system of claim 1, wherein the first pressure sensor and the second pressure sensor are piezoelectric pressure sensors.

4. The system of claim 1, wherein the first pressure sensor and the second pressure sensor are Aluminum Nitride piezoelectric pressure sensors, and the system monitors a nuclear facility comprising an electrorefiner.

5. The system of claim 1, wherein the parameter monitoring service maps the first pressure reading and the second pressure reading to at least one parameter value using data that relates: the first pressure reading to a first variable depth of the first pressure sensor, the second pressure reading to a second variable depth of the second pressure sensor.

6. The system of claim 1, wherein the parameter monitoring service receives the first pressure reading and the second pressure reading from a wireless communication component.

7. A system comprising:

a housing of a multiple parameter sensing device that identifies temperature and pressure;

a diaphragm of the multiple parameter sensing device;

a plurality of resonant sensors, wherein a first resonant sensor is connected to the diaphragm and a second resonant sensor is connected to the housing, thereby enabling the identification of the temperature and compensation for temperature induced frequency shift;

a first pressure sensor located at a first predetermined height relative to a predetermined position within an electrolyte solution, wherein the first pressure sensor detects a first pressure reading;

a second pressure sensor located at a second predetermined height relative to the predetermined position within the electrolyte solution, wherein the second pressure sensor detects a second pressure reading; and a parameter monitoring service that receives the first pressure reading and the second pressure reading, and maps the first pressure reading and the second pressure reading to at least one parameter value for at least one predetermined parameter, wherein at least one of the first pressure sensor and the second pressure sensor is provided using at least one resonant sensor of the multiple parameter sensing device.

8. The system of claim 7, wherein the parameter monitoring service maps the first pressure reading and the second pressure reading to at least one parameter value using data that relates: the first pressure reading to a first variable depth of the first pressure sensor, the second pressure reading to a second variable depth of the second pressure sensor.

9. The system of claim 7, wherein the housing is a stainless steel housing.

10. The system of claim 7, further comprising:

a tungsten carbide shielding on an inner surface of the housing of the multiple parameter sensing device.

11. The system of claim 7, wherein the diaphragm is a stainless steel diaphragm.

12. The system of claim 7, wherein a respective resonant sensor comprises two tines comprising Aluminum Nitride.

13. A multiple parameter sensing device comprising:

a housing of the multiple parameter sensing device;

a diaphragm of the multiple parameter sensing device; and a plurality of resonant sensors, wherein a first resonant sensor is connected to the diaphragm and a second resonant sensor is connected to the housing, thereby enabling identification of temperature, pressure, and compensation for temperature induced frequency shift;

wherein the plurality of resonant sensors of the multiple parameter sensing device provides at least one of: a first pressure sensor located at a first predetermined height relative to a predetermined position within an electrolyte solution, and a second pressure sensor located at a second predetermined height relative to the predetermined position within the electrolyte solution, wherein a first pressure reading of the first pressure sensor and a second pressure reading of the second pressure sensor are mapped to at least one parameter value.

14. The multiple parameter sensing device of claim 13, wherein the housing is a stainless steel housing.

15. The multiple parameter sensing device of claim 13, further comprising:

a tungsten carbide shielding on an inner surface of the housing.

16. The multiple parameter sensing device of claim 13, wherein the diaphragm is a stainless steel diaphragm.

17. The multiple parameter sensing device of claim 13, wherein a respective resonant sensor comprises two tines comprising Aluminum Nitride.

* * * * *